United States Patent [19]
Reneris

[11] Patent Number: 5,784,628
[45] Date of Patent: Jul. 21, 1998

[54] METHOD AND SYSTEM FOR CONTROLLING POWER CONSUMPTION IN A COMPUTER SYSTEM

[75] Inventor: Kenneth S. Reneris, Redmond, Wash.

[73] Assignee: Microsoft Corporation, Redmond, Wash.

[21] Appl. No.: 614,186

[22] Filed: Mar. 12, 1996

[51] Int. Cl.$^6$ .................................. G06F 1/26; G06F 1/32
[52] U.S. Cl. .............................. 395/750.01; 395/750.06; 395/182.22; 364/707
[58] Field of Search .......................... 395/750, 182.21, 395/182.22, 182.2, 750.01, 750.06, 800; 364/707, 492; 365/225, 227; 307/66; 377/16

[56] References Cited

U.S. PATENT DOCUMENTS

| | | | |
|---|---|---|---|
| 4,143,283 | 3/1979 | Graf et al. | 307/66 |
| 4,234,920 | 11/1980 | Van Ness et al. | 395/182.2 |
| 4,458,307 | 7/1984 | McAnlis et al. | 395/182.2 |
| 4,639,864 | 1/1987 | Katzman et al. | 395/750 |
| 4,726,024 | 2/1988 | Guziak et al. | 395/182.22 |
| 4,819,237 | 4/1989 | Hamilton et al. | 395/182.2 |
| 4,907,150 | 3/1990 | Arroyo et al. | 395/182.22 |
| 5,012,406 | 4/1991 | Martin | 395/182.2 |
| 5,167,024 | 11/1992 | Smith et al. | 395/750 |
| 5,175,853 | 12/1992 | Kardach et al. | 395/733 |
| 5,218,607 | 6/1993 | Saito et al. | 395/182.2 |
| 5,230,074 | 7/1993 | Canova, Jr. et al. | 395/750 |
| 5,237,692 | 8/1993 | Raasch et al. | 395/740 |
| 5,239,652 | 8/1993 | Seibert et al. | 395/750 |
| 5,241,680 | 8/1993 | Cole et al. | 395/750 |
| 5,287,525 | 2/1994 | Lum et al. | 395/750 |
| 5,297,282 | 3/1994 | Meilak et al. | 395/750 |
| 5,355,501 | 10/1994 | Gross et al. | 395/750 |
| 5,396,635 | 3/1995 | Fung | 395/800 |
| 5,414,860 | 5/1995 | Canova, Jr. et al. | 395/750 |
| 5,430,867 | 7/1995 | Gunji | 395/188.01 |
| 5,560,024 | 9/1996 | Harper et al. | 395/750 |
| 5,574,920 | 11/1996 | Parry | 395/750.08 |
| 5,590,342 | 12/1996 | Marisetty | 395/750 |
| 5,638,541 | 6/1997 | Sadashivaiah | 395/750.05 |

*Primary Examiner*—Gopal C. Ray
*Attorney, Agent, or Firm*—Jones & Askew, LLP

[57] ABSTRACT

A portable, software-controlled system for managing power consumption in a computer system. The power management system is integrated with the operating system of the computer system and is extensible to any add-on devices that are installed into the computer system. Upon the detection of a power down condition indicating that the computer system should be powered down, the power management system may verify that the computer system can be powered down without causing any of the devices that are connected to the computer to lose application data. If all of the devices agree that the computer system can be powered down, then each device has its state saved into memory and is powered down. Next, the state of each processor is saved into memory and power to the processors is disabled. In order to suspend the computer system, power to the memory is maintained, allowing each device state and processor state to be restored upon reboot. The computer system may be hibernated by writing all of the active memory (including each device state and processor state) to a secondary storage area and then powering off the entire computer system, including memory.

19 Claims, 7 Drawing Sheets

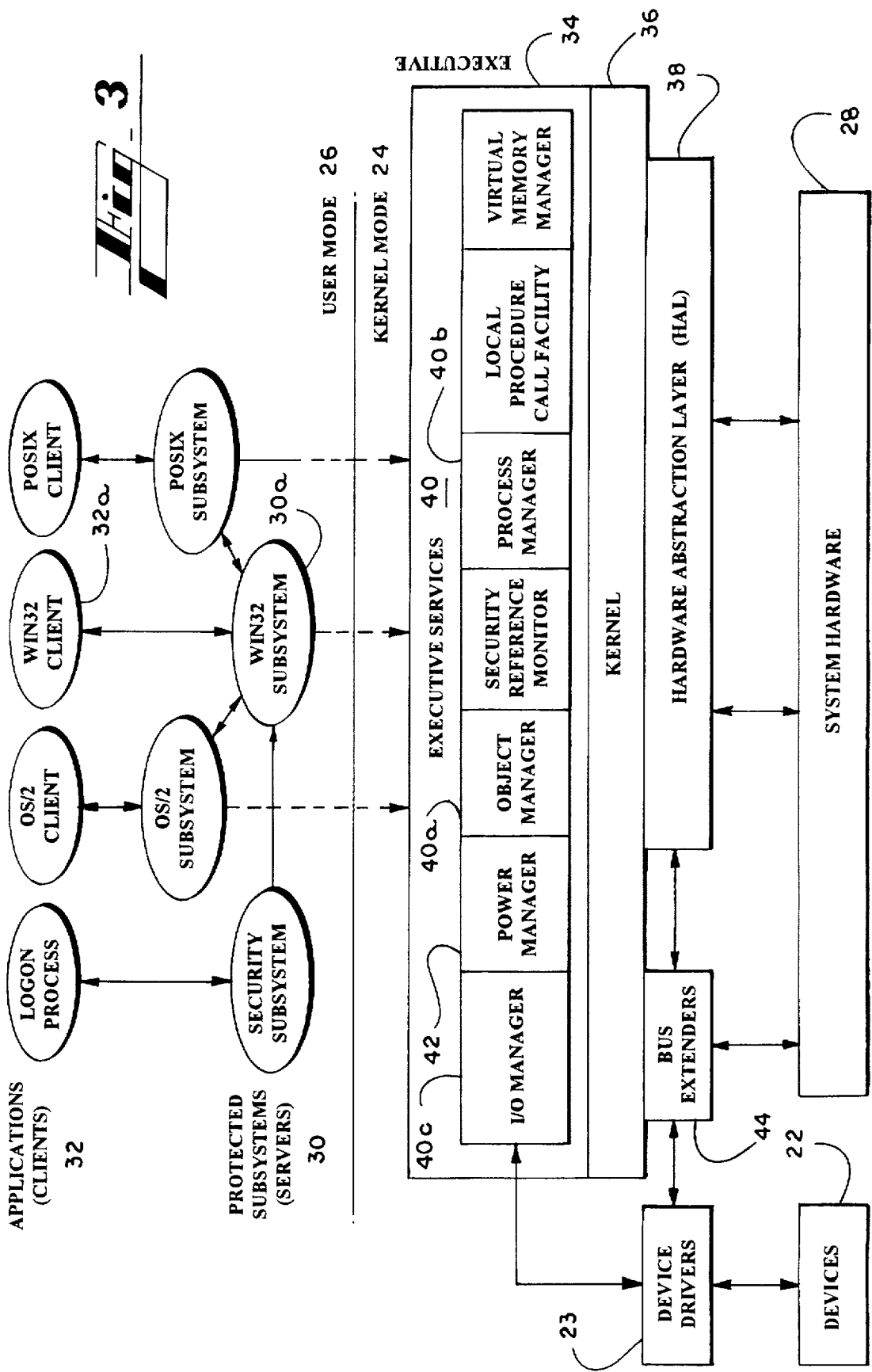

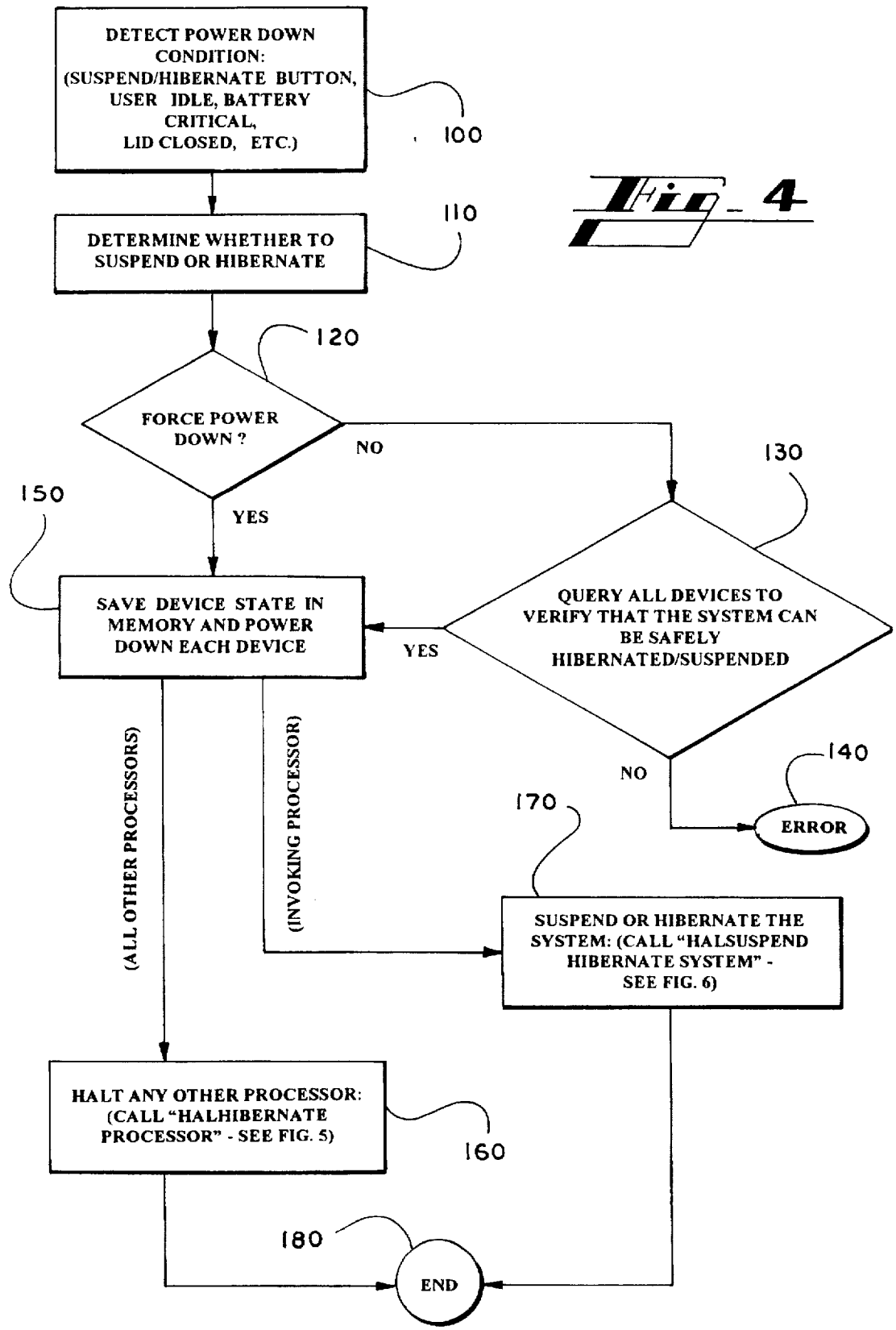

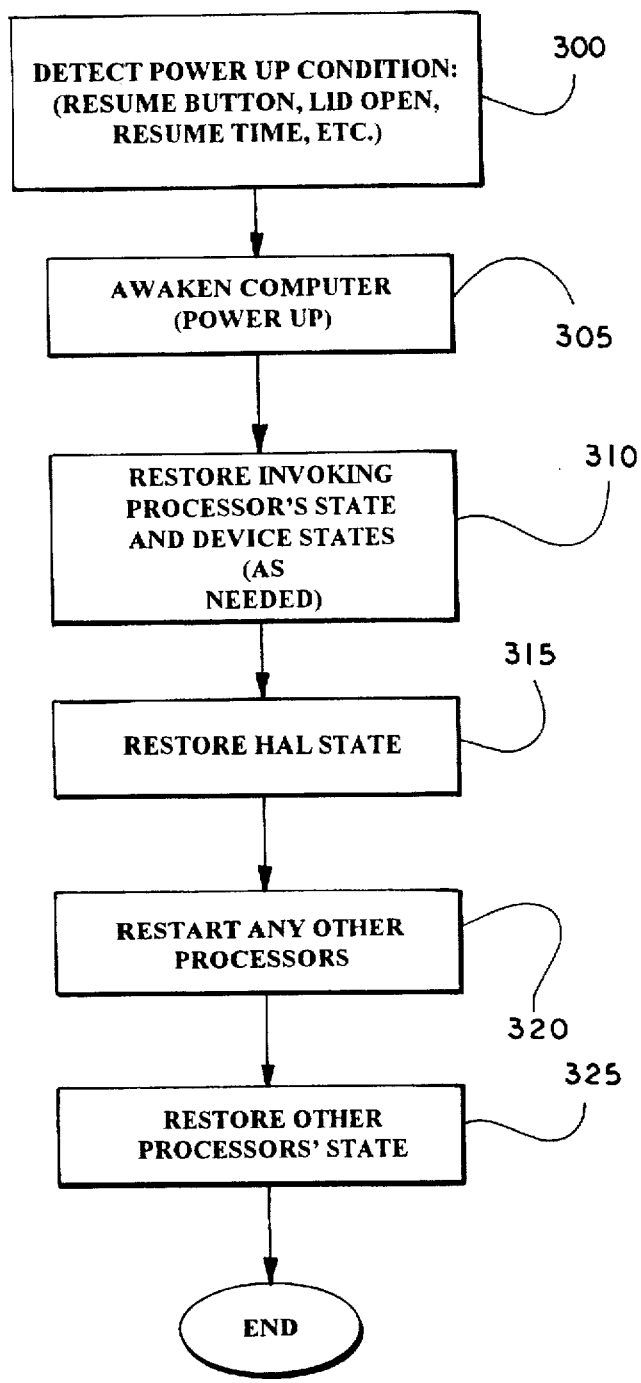
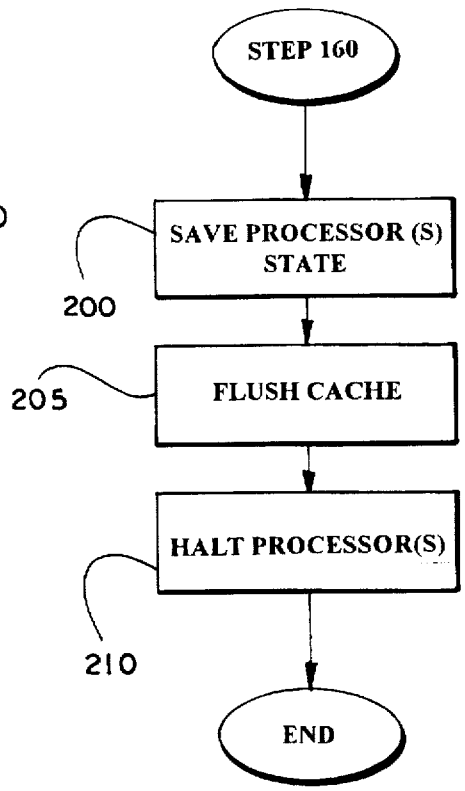
Fig_5
Fig_7

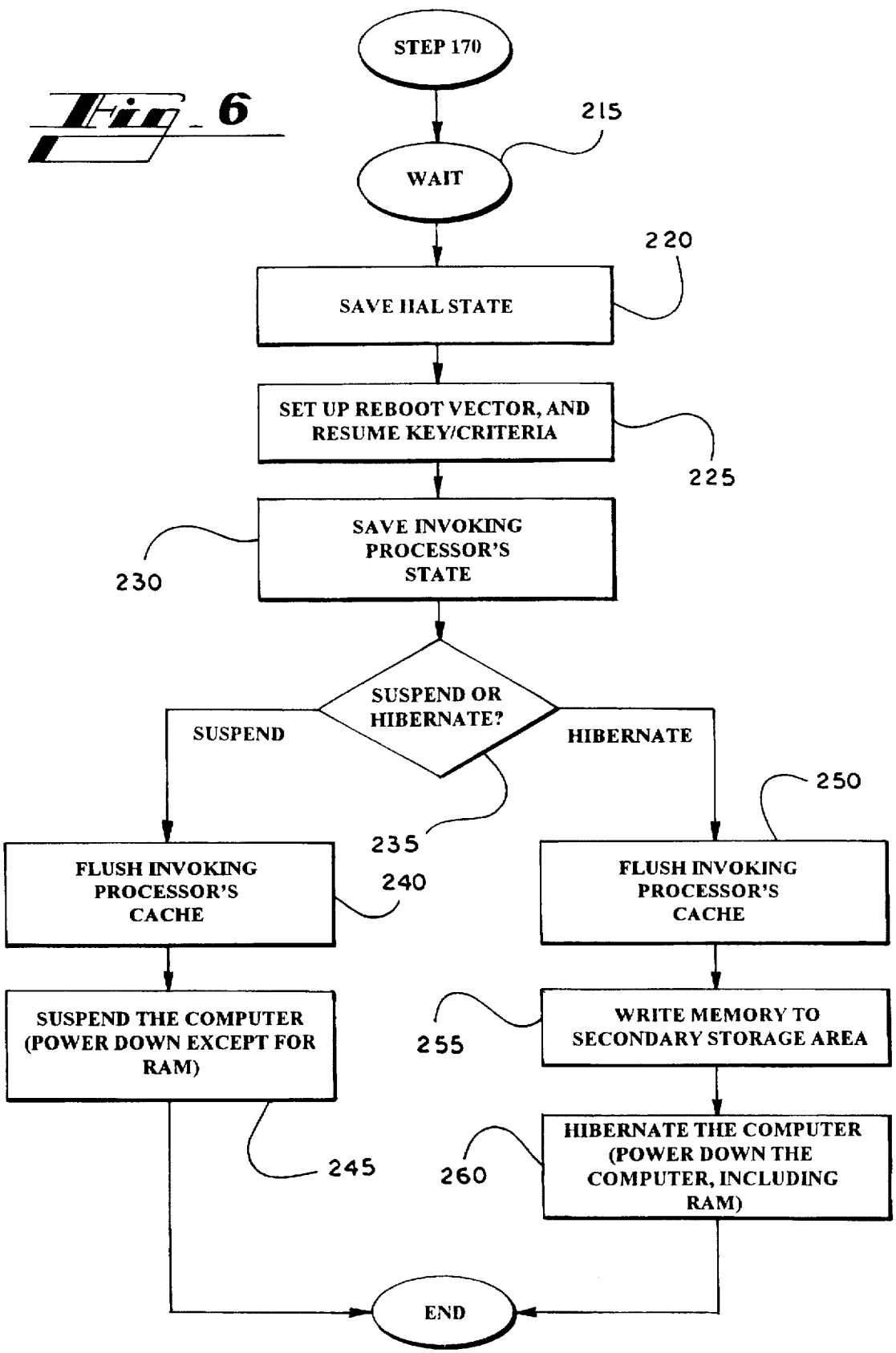

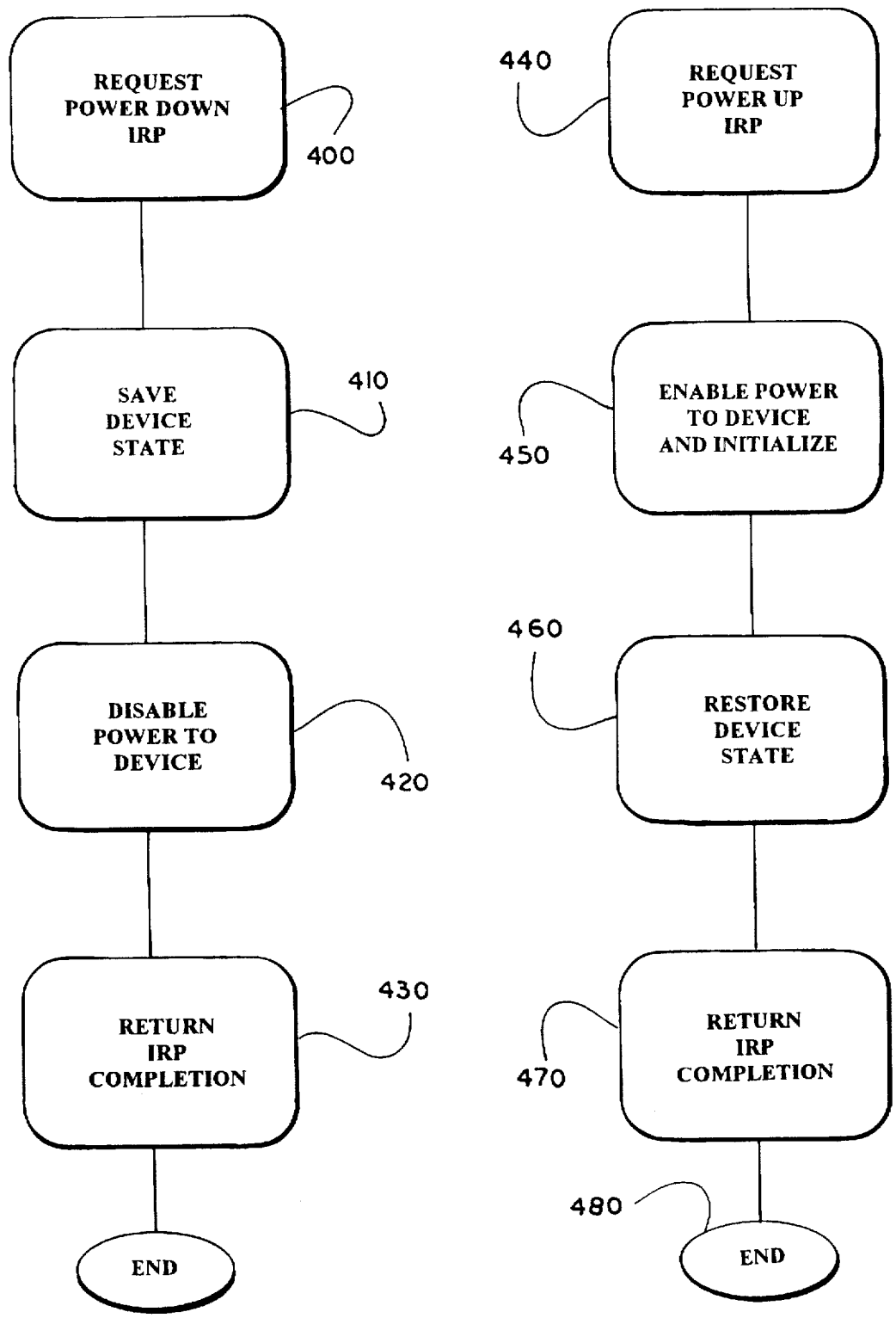

METHOD AND SYSTEM FOR CONTROLLING POWER CONSUMPTION IN A COMPUTER SYSTEM

TECHNICAL FIELD

This invention relates generally to systems for managing power consumption in computers, and more particularly to a portable, software-controlled power management system that is integrated with the computer's operating system and device drivers.

BACKGROUND OF THE INVENTION

"Power management" refers to a computer system's ability to conserve or otherwise manage the power that it consumes. Traditionally, the only power management that existed in computers was the main power switch. As long as the power switch to the computer or to a particular device connected to the computer was turned on, power was supplied to the computer or device, regardless of whether it was actually in use.

As computers have become more powerful and as the number of devices available to users continues to expand, the total power requirements of computer systems have increased, leading to demands for more sophisticated power management systems. In particular, there is growing demand for power management systems that are able to detect when the computer or a particular device is not in use, and dynamically disable the power to the computer or device in order to conserve energy.

Power management concerns are especially prevalent in battery-powered portable computers, which have a finite supply of power available to run the computer and its devices. Conventionally, manufacturers have been able to extend battery life in these computers only by having intrinsic knowledge of what devices are connected to the computer and the power requirements of those devices. This closed architecture, however, has proven unsatisfactory to users that desire to expand the computer's capabilities by adding new devices to the computer. Because there is generally no corresponding power management provided for the new devices, those devices do not participate fully in power management.

Power management concerns are not limited to battery-powered portable computers, but extend to AC-powered computer systems as well. The United States government has recently joined in the effort to encourage energy conservation and power management in all personal computers. The Environmental Protection Agency, for example, has established an "Energy Star" program to encourage energy efficiency in computers. The requirements under the program are intentionally liberal and vague; the only specific requirements are that a computer should consume 30 watts or less of power when it is idle as shipped by the original equipment manufacturer and that the monitor should also consume less than an additional 30 watts of power when idle. Nevertheless, the overall intent of the program of encouraging energy conservation in computers is clear. The government has added strong incentives for those in the computer industry to comply with these guidelines by making a commitment to purchase only energy efficient personal computers, sometimes called "green pc's".

Currently known methods of power management in computer systems focus primarily on non-operating system solutions. Many current systems provide power management capabilities by adding expensive dedicated monitoring hardware that is controlled by a hybrid of hidden system management mode software. For example, special hardware may be added that monitors the processor to determine whether or not it is busy. If the processor is not busy, then an interrupt is generated which may slow down the processor's operation in order to conserve energy.

In these power management systems, the original equipment manufacturer (OEM) is in control of the power management policy and the actual code which turns power on and off to devices, thus circumventing the operating system. Because the power management system operates independently from the operating system, device utilization and power management decisions are made based upon observed past data, rather than anticipatory data. Thus, the monitoring hardware is unable to determine whether the processor is waiting for the completion of another operation to do something else. As a result, many conventional power management schemes will only slow the processor down, rather than stopping it completely, thus reducing the effectiveness of the power management. Further, because conventional power management schemes are transparent to the operating system, they cannot modify the behavior of the operating system.

Conventional power management schemes can also cause problems for full-featured operating systems, such as the "WINDOWS NT" operating system, developed by Microsoft Corporation, the assignee of the present invention. For example, the computer's ROM BIOS (basic input/output system) must transparently adjust a device's state (i.e., its condition at a particular time) without impairing the operating system driver which is also attempting to utilize the device. This can cause the operating system to encounter unexpected errors since a device may be powered down unexpectedly.

Furthermore, current hardware-based power management schemes are generally based upon specific microprocessors and specific platforms and are therefore not portable to other platforms. As with many battery-powered computer systems, these schemes often only work for devices which are integrated into the machine. Thus, new devices which are added to the computer system generally do not participate in power management. Even for integrated devices, there is still a lack of coordination between the operating system and the power management system, which can lead to synchronization difficulties.

For these reasons, computer manufacturers are now desirous for a power management system that is fully integrated with the computer's operating system.

Therefore there is a need for a portable, software-controlled power management system that is integrated into the operating system of the computer.

There is also a need for a power management system that integrates device utilization and power savings decisions with device drivers that control the various devices installed in the computer.

There is also a need for a power management system that provides portability and extensibility across a variety of platforms and devices.

SUMMARY OF THE INVENTION

As will be seen, the foregoing invention satisfies the foregoing needs. Briefly described, the present invention provides a portable, software-controlled system for managing power consumption in a computer system. The power management system is integrated with the operating system of the computer system, which allows for more informed power saving decisions. In addition, the power management system is extensible to add-on devices that are connected to the computer system.

The present invention provides for two types of power management: system-level power management and device-level power management. System-level power management is directed to the shutting down of the computer system in an orderly fashion when it is not in use, and the subsequent resuming of the computer system when it is in use, in order to conserve energy. According to one aspect of the present invention, improved system-level power management is achieved through the coordination of the operating system and device drivers that control the various devices connected to the computer system.

Device-level power management refers to the ability to dynamically adjust the power state of a particular device, depending on whether or not it is currently in use, in order to conserve energy. In the present invention, device-level power management is provided either by the device drivers that control the various devices that are connected to the computer system or by various operating system components.

Moving power management into the operating system allows for more informed device utilization and power savings decisions than in previous hardware-based schemes. For example, conventional power management systems will resume a disk drive from a power down state whenever the disk drive is first accessed. On the other hand, the power management system of the present invention may be programmed to delay the resuming of the disk drive until it is actually needed. Thus, the present invention allows the "core" of the computer system, i.e., the processor, bus controllers, system clock, cache, etc., and all devices connected to the computer system, to be powered down more frequently and for longer periods of time, thus achieving greater power savings.

By integrating power management into the operating system, the present invention also provides greater extensibility and portability that was not possible with previous hardware-based schemes. Thus, even new devices that are added to the computer system which were not previously known to the operating system may participate fully in power management.

According to one aspect of the invention, a portable, software-controlled power management system includes an operating system that is operative to control the power consumption of a computer system. The operating system first detects a "power down condition" indicating that the computer system should be placed into a "suspended power state" or a "hibernated power state." The power down condition may be initiated by a user of the computer system or programmatically by a program that is executing on the computer system.

In general, "suspending" a computer system is similar to powering off the computer (e.g., by turning off the main power switch), except that power to memory is maintained and dynamic RAM (DRAM) is refreshed. In addition, the operations of the computer are held in a "suspended power state" for a suspend operation, whereas the system loses its current operational state on a general power down. "Hibernating" a computer system is similar to "suspending" the system, except the entire computer system, including memory, is powered off.

In response to the detection of a power down condition, all of the device drivers of the computer system may first be queried to determine whether the computer system can be suspended or hibernated. If all of the device drivers agree that the computer system can be suspended or hibernated, then the computer system will be placed into the power state requested.

The computer system is placed into the "suspended power state" by first saving the device state of each device that is connected to the computer system into memory and powering down each device. Power to each device may or may not actually be disabled by its device driver, but the device is treated as being powered off by the computer system. The device driver will not be able to use the device until it powers the device back on.

Next, the processor state of each processor is saved into memory, and each processor is halted or stopped, i.e., placed into a very low power state. As is well known in the art, the "state" of a processor is akin to a snapshot of its contents, i.e., its register set, the mode that it is in, etc. The system remains in a suspended power state until it is resumed by a resume action. The processor's state is restored from memory and the state of each device is restored on an "as needed" basis. When the resume action completes, the computer system is again usable.

The computer system is placed into the "hibernated power state" in a similar manner as the suspended power state, with the additional step that the memory state of the processor and the state of each device are written to a secondary storage area or disk. This allows the entire computer system, including memory, to be powered off during the hibernate. Upon reboot, the memory states are restored from the secondary storage area and then the operating system resumes as it would from a suspended state.

According to another aspect of the present invention, device-level power management decisions are made by different components of the computer system, depending on whether the device is being powered up or down. During power down, device-level power management decisions are moved to the highest level possible, i.e., where the powering down can be done most efficiently. During power up, on the other hand, device-level power management decisions are made by the device driver that is in control of the device.

In general, a device is powered down when it is not in use in order to conserve energy. Thus, a system that remains idle for some duration will result in power to all devices being turned off, leaving the processor in a very low power state, with only enough power to enable the processor to field interrupts. A device is then powered up as it is needed.

The portable, software-controlled power management system of the present invention enables the power status of the computer system and all the devices in the system to be controlled from a central body of software, namely the operating system. This differs from conventional power management systems that control the power state of the computer system using the firmware, slushware or romware that is distributed with the computer's hardware.

By integrating the power management decisions into the operating system, the present invention provides a number of useful advantages that were not possible with conventional power management systems. For example, a standardized programmatic and user interface may be provided to control the power state of the computer system. Further, the operating system can effectively predict power management actions by detecting explicit user actions which are invisible to the hardware and by manipulating its own internal modules. For example, the integrated power management system of the present invention enables the operating system to delay turning off the disk drive motor until after it has flushed the disk cache. Such action is not possible with hardware-supplied power management. In addition, by integrating the power management system into the operating system, a computer system's power state can be controlled from a remote location in a networked computer environment.

Other advantages of the present invention will become apparent upon reading the following detailed description, drawings and appended claims.

BRIEF DESCRIPTION OF THE DRAWINGS

FIG. 3 is a block diagram illustrating the architecture of the "WINDOWS NT" operating system, modified in accordance with the preferred embodiment of present invention to provide integrated power management.

FIG. 4. is a flow chart illustrating a "power down" sequence which is performed in order to shut the power off to the computer system and its devices shown in FIG. 1.

FIG. 5. is a detailed flow chart of the "HalHibernateProcessor" routine shown in FIG. 4.

FIG. 6 is a detailed flow chart of the "HalSuspendHibernateSystem" routine shown in FIG. 4.

FIG. 7 is a flow chart illustrating a "power up" sequence which is performed in order to resume the computer system and its devices from a hibernate state or suspend state.

FIGS. 8A–B are flow charts illustrating the implementation of device-level power management for dynamically adjusting the power state of a particular device in order to conserve energy.

DETAILED DESCRIPTION

Figure 1:
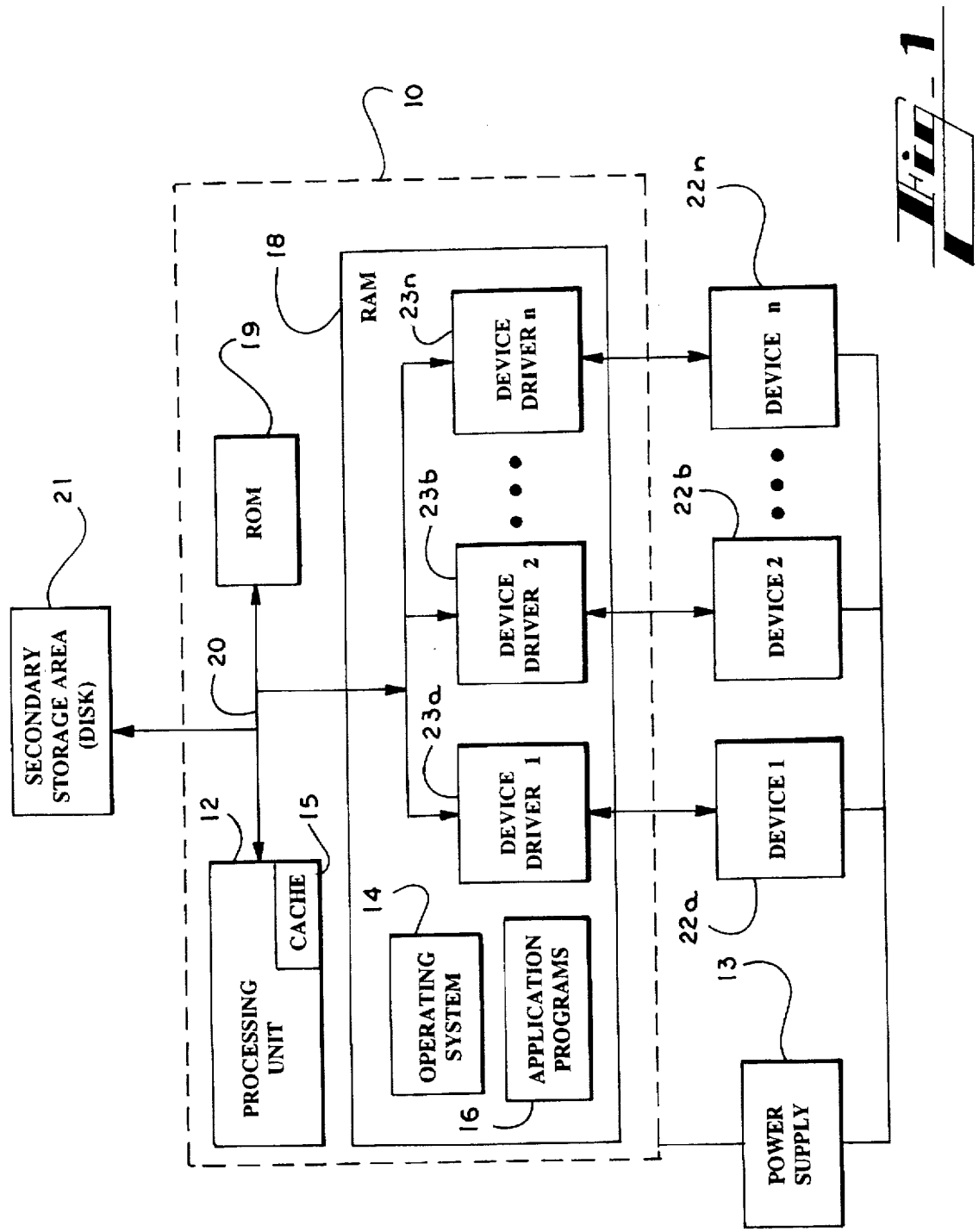
FIG. 1 is a block diagram of the preferred operating environment of the present invention.

Referring now to the drawing figures, in which like numerals indicate like elements or steps throughout the several views, the preferred embodiment of the present invention will be described. In general, the present invention provides a portable, software-controlled power management system that is integrated with the operating system of the computer system. By integrating device utilization and power management decisions into the operating system, more efficient and more intelligent power management is achieved. Furthermore, because it is software-controlled, the power management system of the present invention is platform portable and may be fully operative with new devices that are added to the computer system.

FIG. 1 illustrates the preferred operating environment of the present invention, in which computer system 10 executes the steps of the methods described herein. The computer system 10 comprises a processing unit 12 which operates to execute an operating system 14 and application programs 16 desired by an operator of the computer system. Those skilled in the art will appreciate that processing unit 12 may comprise a single processor or multiple processors that are connected together to carry out processes in tandem. The operating system 14 and application programs 16 can be stored within memory storage area (RAM) 18. Read-only memory (ROM) 19 stores bootup firmware and basic input/output system (BIOS) for the computer system 10. The ROM 19 is sometimes referred to as the "bootup ROM".

The computer system further comprises a processor cache 15, which is an area of high-speed memory linked directly to the processing unit 12. The processing unit 12 can access information in the processor cache 15 much faster than it can access data stored in RAM 18.

The computer system 10 further comprises a communications link 20, which allows the computer system to communicate with other processing units, data storage devices, or other peripherals. Communications link 20 may comprise any of the common buses or interfaces with configuration space which are well known in the art, such as ISA, EISA, MCA, PCI, SCSI, PCMCIA, USB, CardBus, etc. In particular, it is contemplated that a secondary storage area 21 may be connected to the computer system 10 for mass storage of information. Secondary storage area 21 may comprise a data storage device such as a hard disk, or any other volatile or non-volatile memory storage system.

It is also contemplated that a plurality of devices 22a–22n may be connected to the computer system 10 via communications link 20. As used herein, the term "device" is used to refer to any computer subsystem or peripheral that may be connected to a computer and controlled by its processing unit. Devices 22a–22n may include, without limitation, video displays, keyboards, mouses, disk drives, tape drives, CD-ROM drives, printers, modems, scanners, serial ports, parallel ports, etc. The computer system 10 and devices 22a–22n are powered by a power supply 13, which may be a battery and/or a conventional AC-power supply. Although FIG. 1 illustrates devices 22a–22n as being located outside of the computer system 10, those skilled in the art will appreciate that any or all of the devices 22a–22n could also be physically located inside the computer system. For example, an internal disk drive would be located inside computer system 10, while a printer typically would be located outside.

Devices 22a–22n may require their own controlling software, or "device drivers" 23a–23n. Device drivers 23a–23n are software components that permit the processing unit 12 to communicate with devices 22a–22n. For example, if device 22a is a printer, then device driver 23a may be a printer driver that translates computer data into a form understood by the printer. Each of the device drivers 23a–23n may consist of a single-layer or of multiple layers of drivers. For example, higher-level drivers may be provided that are associated with a specific application program and which perform only the data translation function.

Lower-level drivers may then be relied upon to actually send the data to its associated device. Although FIG. 1 illustrates device drivers 23a–23n as being stored inside RAM 18, those skilled in the art will appreciate that any or all of the device drivers 23a–23n could also be stored in memory outside of the computer system 10.

Figure 2:
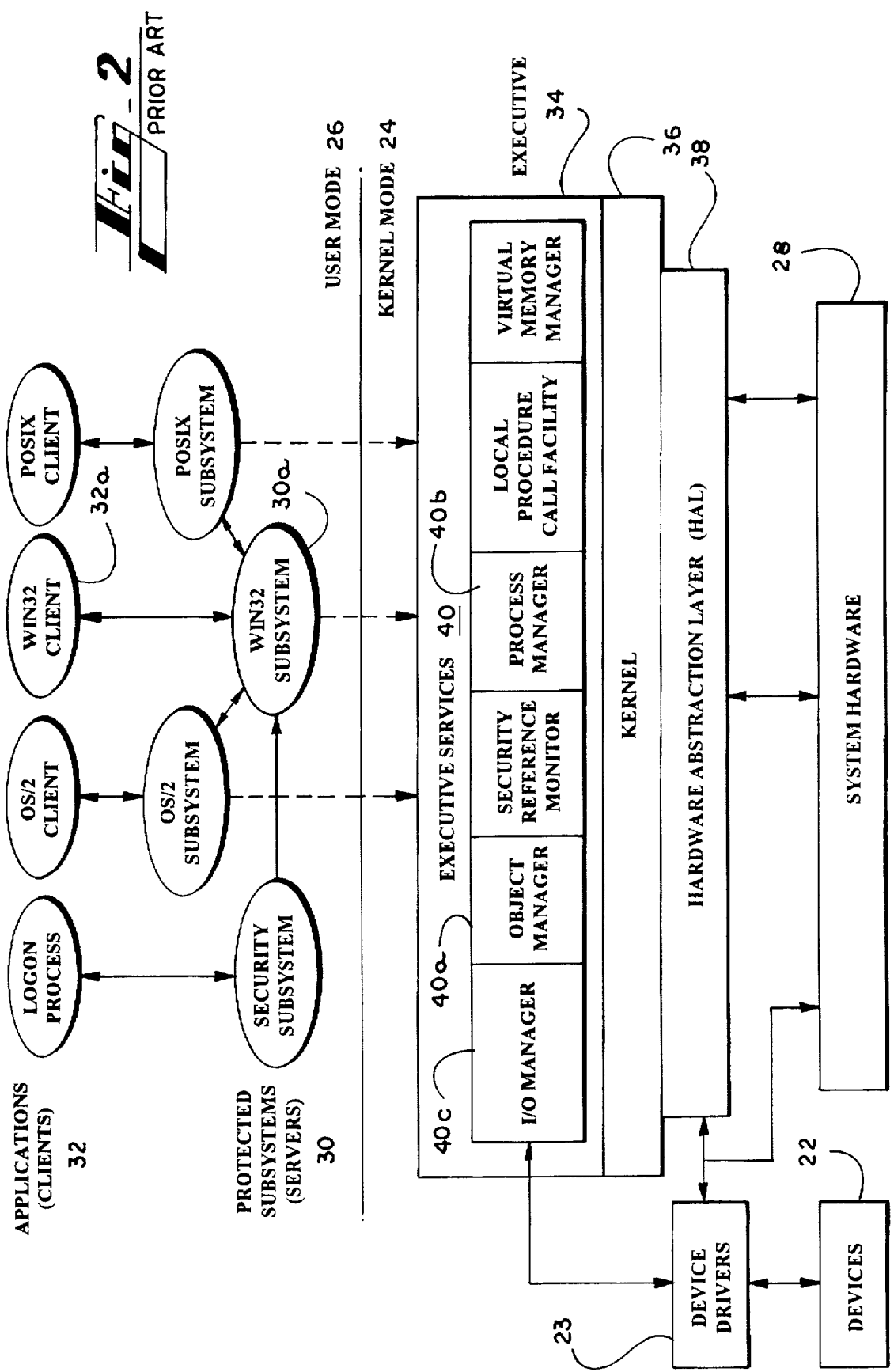
FIG. 2 is a block diagram illustrating the conventional architecture of the "WINDOWS NT" operating system.

In the preferred embodiment, the operating system 14 is a modified version of the "WINDOWS NT" operating system, developed by Microsoft Corporation. FIG. 2 is a block diagram illustrating the conventional architecture of the "WINDOWS NT" operating system, which will be briefly described before proceeding with the details of the present invention.

Referring to FIGS. 1 and 2, as is well known in the art, the "WINDOWS NT" operating system is divided into two parts: the "kernel mode" 24 and the "user mode" 26. The user mode 26 is a nonprivileged processor mode in which servers (or "protected subsystems") 30 and application programs 16 run, with a limited set of interfaces available and with limited access to system data.

The kernel mode 24, on the other hand, is a privileged processor mode in which the operating system code runs, with access to system data and to the system hardware 28.

The kernel mode portion of the operating system is called the "executive" 34, which comprises a series of objects that implement virtual memory management, object (resource) management, I/O and file systems, interprocess communication, and portions of the security system.

The lower portions of the executive 34 are called the "kernel" 36 and the "hardware abstraction layer" ("HAL") 38. The kernel 36 performs low-level operating system functions, such as thread scheduling, interrupt and exception dispatching, and multiprocessor synchronization. The HAL 38 is a layer of code that protects the kernel 36 and the rest of the executive 34 from platform-specific hardware differences. The HAL 38 hides hardware-dependent details such as I/O interfaces, interrupt controllers, and multiprocessor communication mechanisms. Rather than access system hardware 28 directly, the components of the executive 34 maintain portability by calling the HAL 38 routine when platform-specific information is needed. The system hardware 28 is part of the computer system 10 shown in FIG. 1 and may include processing unit 12, RAM 18 and input/output (I/O) ports.

The user mode portion of the operating system 14 is divided into several protected subsystems 30, also called servers, such as the Win32 subsystem 30a, and applications or "clients" 32, such as the Win32 client 32a. Each protected subsystem 30 implements a single set of services, for example, memory services, process creation services, or processor scheduling services. The Win32 subsystem 30a, for example, makes a 32-bit application programming interface (API) available to application programs 16. Each protected subsystem 30 runs in user mode 26, executing a loop that checks whether a client 32 has requested one of its services.

The client 32, which may be another operating system component or an application program 16, requests a service by sending a message to the protected subsystem 30, as represented by the solid arrow between the Win32 client 32a and the Win32 subsystem 30a. Although FIG. 2 illustrates the message as being passed directly from the client 32 to the protected subsystem 30, the message actually passes through the executive 34, which delivers the message to the protected subsystem 30. After the protected subsystem 30 performs the requested operation, the kernel returns the results to the client 32 in another message (not illustrated).

Still referring to FIGS. 1 and 2, the executive 34 is a series of components, each of which implements two sets of functions: executive services 40, which protected subsystems 30 and other executive components can call, and internal routines, which are available only to components within the executive 34. Executive services 40 include the object manager 40a, which creates, manages, and deletes objects, which are abstract data structures used to represent operating system resources; the process manager 40b, which creates and terminates processes and threads, and suspends and resumes the execution of threads; and the I/O manager 40c, which implements device-dependent input/output facilities.

The I/O manager 40c of the executive 34 is a collection of operating system code that accepts I/O requests from user mode and kernel mode processes and delivers them to devices 22. Between the user mode services and the mechanics of the devices 22 lie several discrete system components, including device drivers 23. Device drivers 23 include full-blown file systems, physical device drivers, and network transport drivers. File systems in "WINDOWS NT" are simply device drivers that accept I/O requests to files and satisfy the requests by issuing their own, more explicit, requests to physical device drivers. Each device driver 23 is a self-contained component that can be added to or removed from the operating system 14 dynamically.

Still referring to FIGS. 1 and 2, the operation of the I/O system will be briefly explained. Each I/O operation is represented by an "I/O request packet" (IRP), which is a data structure created by the I/O manager 40c and used to control its processing. The I/O manager 40c passes the IRP to the correct device driver 23 and disposes of the IRP when the I/O operation is complete. The device driver 23 receives the IRP, performs the requested operation, and either passes it back to the I/O manager 40c for completion or passes it on to another device driver 23 (via the I/O manager 40c) for further processing. As is well known in the art, "completing" an IRP is the final step in the I/O manager's processing of the IRP. A typical I/O completion includes the deleting of internal data structures associated with the IRP, the returning of data to the caller, the recording of the final status of the operation in an I/O status block, and the setting of a file object and/or event to the signaled state.

In addition to creating and disposing IRPs, the I/O manager 40c supplies code that is common to different device drivers 23 and that the device drivers call to carry out their I/O processing. By consolidating common tasks in the I/O manager 40c, individual device drivers 23 may be simpler and more compact than conventional drivers.

The architecture of the I/O system allows the I/O manager 40c to call any device driver 23 without requiring any special knowledge of its structure or internal details. With a single-layered driver, an IRP passes to the I/O manager 40c and then to the device driver 23, which communicates directly with the device 22.

Device drivers 23 can also call each other (via the I/O manager 40c) to achieve layered, independent processing of an IRP. With multi-layered drivers, the IRP passes through two or more device drivers 23 during its processing. For example, a computer system may have multiple devices 22, such as disk or tape drives, attached to a SCSI bus. An IRP to such a disk drive would travel through a file system driver, a disk class driver that issues the SCSI requests, and a SCSI port driver that sends the request to the disk using SCSI bus protocol.

With that preface, the preferred embodiment of the present invention will now be described. The present invention provides a portable, software-controlled system for managing power consumption in a computer system. The power management system is integrated with the computer's operating system 14 and device drivers 23, which allows for more informed power saving decisions.

More particularly, the present invention provides for two types of power management: system-level power management and device-level power management. System-level power management is directed to the shutting down of electrical power for the computer system in an orderly fashion when it is not in use, and the subsequent resuming of the computer system when it is in use, in order to conserve energy. In the preferred embodiment, improved system-level power management is achieved by integrating power management into the operating system 14 and device drivers 23 that control the various devices 22 connected to the computer system.

Device-level power management refers to the ability to dynamically adjust the power state of a particular device 22, depending on whether or not it is currently in use, in order to conserve energy. In the preferred embodiment, device-level power management is provided either by the device drivers 23 that control the various devices 22 connected to the system, or by various operating system components. Thus, all power management decisions are in some form made by the operating system 14 or a device driver 23 of the operating system.

Moving power management into the operating system 14 allows for more informed and more efficient device utilization and power savings decisions than in previous hardware-based schemes. This allows the core of the computer system and all devices connected to the computer system to be powered down more frequently, thus achieving greater power savings. Furthermore, integrating power management into the operating system 14 provides greater extensibility and portability that was not possible with previous hardware-based schemes. Thus, even new devices 22 that are added to the computer system which were not previously known to the operating system 14 may participate fully in power management.

FIG. 3 is a block diagram illustrating the preferred operating system 14 (FIG. 1) of the present invention. As can be seen from FIG. 3, the operating system 14 is a modified version of the "WINDOWS NT" operating system shown in FIG. 2, which has been modified to accommodate the power management features and capabilities in accordance with the present invention. In particular, the executive services 40 of the executive 34 shown in FIG. 3 includes a power manager 42, which coordinates and controls power management for the computer system 10 (FIG. 1). In addition, the preferred embodiment includes bus extenders 44, which are device drivers that effectively abstract bus details and potentially device-dependent details from the HAL 38. The operation and function of the bus extenders 44 in the implementation of power management will be discussed in greater detail below.

Referring to FIGS. 4–7, the operation of the power manager 42 in the implementation of system-level power management will be described. FIGS. 4–7 are flow charts illustrating sequences of steps forming processes which may be embodied as programs for the processing unit 12 (FIG. 1).

In the preferred embodiment, there are two different levels of powering down the computer system 10: "suspending" or "hibernating". In general, "suspending" a computer system is similar to powering off the computer system (e.g., by turning off the main power switch), except that power to memory is maintained and dynamic RAM (DRAM) is refreshed, leaving the computer system in a "suspended" power state. The processor's state and the state of each device are stored in memory during the suspend. The system remains in a suspended state until it is resumed by a resume action, which restores the processor's state from memory. The state of each device is also restored on an "as needed" basis.

"Hibernating" a computer system is similar to suspending, except that instead of leaving power to the memory on, the current memory states are written to a secondary storage area (e.g., disk), and the computer system is then completely powered off, leaving the computer system in a "hibernated" power state. Upon reboot, the memory states are restored from the secondary storage area, and then the operating system resumes as it would from a suspended power state.

Thus, the present invention contemplates that the computer system may be placed in two different power state levels in order to conserve energy when it is not in use: the suspended power state and the hibernated power state.

Because placing a computer system in a suspended power state does not require a write operation to disk, it is faster than placing the computer system in a hibernated power state. However, because a computer system in the suspended power state is not actually completely powered off (power to memory is maintained), a battery-powered computer system can only remain in the suspended power state for a limited amount of time. On the other hand, a computer system can remain in the hibernated power state indefinitely because it is completely powered off.

FIG. 4 is a flow chart illustrating a "power down" sequence which is performed in order to place the computer system 10 (FIG. 1) in either a suspended power state or a hibernated power state. Referring to FIGS. 1, 3 and 4, the operational flow of the power down sequence is initiated at step 100 when a "power down condition" is detected. The term "power down condition" is used to refer to any detectable condition which indicates that the computer system should be placed in either a suspended or hibernated power state. The power down condition may be detected in any of a number of different ways, both user-initiated and programmatically-initiated. Examples of user initiated power down conditions include the pressing of a suspend or hibernate key by the user (which may be provided as an option on the keyboard), and the closing of the lid on a portable computer.

The power down sequence may also be programmatically-initiated when the user has configured an automatic power down after being idle for a predetermined amount of time, or when the remaining battery life in a battery-powered portable computer reaches a critical stage. It will be appreciated that other power down conditions, both user-initiated and programmatically-initiated, could also be used to initiate the power down sequence.

At step 110, it is determined whether the computer system 10 is to placed in the suspended power state or the hibernated power state. In general, the particular power down condition detected in the previous step will dictate which of the two power states has been called. For example, the pressing of a "suspend" key by the user would call for a suspend, and the pressing of a "hibernate" key would call for a hibernate. In other instances, a single power down condition may dictate either a suspend or a hibernate. For example, the user could set one predetermined user idle time (e.g., 5 minutes) at which the computer system 10 would be placed in the suspended power state and a second predetermined user idle time (e.g., 10 minutes) at which the computer system would be placed in the hibernated power state.

At decision block 120, it is determined whether the power down sequence should be forced. In the preferred embodiment, a power down sequence may be forced when the battery reaches a low charge or when the user instructs the computer system to shut down. For a portable computer, a power down sequence will be forced if the lid is closed. The computer could also be forced to power down programmatically, e.g., by programming the computer to shut down at a particular time.

In general, however, the power down sequence will not be forced, and at decision block 130 all devices 22 will be queried to verify that the computer system 10 can be hibernated or suspended. More particularly, the power manager 42 will send an IRP to each device driver 23, which will complete the IRP if its corresponding device 22 can be powered down without causing any ill effects, such as dropping network connections with open file handles or causing an open communications port to hang up during communications.

If any of the device drivers 23 indicate that the computer system 10 cannot be shut down safely, then the device driver 23 will return an error code at step 140, and the computer system will not be powered down. An audible and/or visible error message may be generated to notify the user that the computer system cannot be shut down. In this case, the device 22 will continue to be in the power state that it held before the power down request arrived.

Thus, the preferred embodiment mandates that every device driver 23 in the computer system 10 power down its corresponding device 22 before placing the computer system in a suspended power state. This differs from current power management schemes in portable computers, in which all devices connected to the motherboard are automatically powered down without any warning when the computer system is shut down, regardless of whether any of the devices are currently in use. By generally not allowing the computer system 10 to suspend or hibernate without first notifying the device drivers 23, the present invention prevents the computer system from shutting down at times that a device 22 did not anticipate, thus reducing the likelihood that the system will crash or that data will be lost or corrupted.

If, on the other hand, all of the devices 22 agree that the computer system 10 can be powered down, or if the power down should be forced at step 120, then the devices 22 are put into a power down state. At step 150 the device state of each device 22 is saved in RAM 18 and the device is powered down. If the computer system 10 is being suspended, this is accomplished by sending an IRP to all device drivers 23 informing them that the computer system is about to be placed in the suspended power state. Power to the device 22 may or may not actually be disabled by the device driver 23, but the device is treated by the computer system as being powered down. Upon completion of this IRP, the device driver 23 is responsible for not allowing any accesses to its corresponding device 22 until a power up request is received.

If, on the other hand, the computer system 10 is being hibernated, an IRP is sent to all device drivers 23 informing them that the computer system is about to be placed in the hibernated power state. This IRP is similar to the IRP sent in the case of a suspend, except that the device 22 does not necessarily have to be actually powered off if the computer system 10 is being placed in the hibernated power state. Instead, the IRP causes device drivers 23 to save their corresponding state into memory such that the memory state can be written to a secondary storage area 21.

Although not shown in the drawings, those skilled in the art will appreciate that each device 22 has an associated device cache that will be flushed by its device driver 23 before the device is suspended, hibernated or powered off.

In the preferred embodiment, any peripherals such as external disk drives, printers, and monitors are powered off first, followed by the powering off of the internal devices. Those skilled in the art will appreciate that the computer system may include control mechanisms that provide system hardware support or device support to enable or disable power to particular devices 22. For example, a device 22 may contain its own power saving features, such as an on/off switch, a hibernate and/or suspend button, etc. Alternatively, the power management functionality may be implemented on the system buses, such as PCI, PCMCIA, and CardBus, which support real-time configuration spaces with the ability to uniquely identify installed devices 22.

After all of the devices 22 are put in a power down state, then the computer system can be safely suspended or hibernated. The remainder of the discussion on the power down sequence assumes a multiprocessor computer system 10, i.e., processing unit 12 shown in FIG. 1 includes one processor which initiates the power down sequence (referred to as the "invoking processor") and other processors that are connected together in the computer system. The invoking processor is also the machine boot processor. In order to place the computer system 10 into either a suspended power state or a hibernated power state, two different routines are called, one by the invoking processor ("HalSuspendHibernateSystem") and the other by all other processors ("HalHibernateProcessor").

At step 160, the "HalHibernateProcessor" routine is called, which halts all processors other than the invoking processor. This routine will be described in detail below with reference to FIG. 5.

Meanwhile, the invoking processor calls the "HalSuspendHibernateSystem" routine at step 170, which waits for the completion of the "HalHibernateProcessor" routine, and then suspends or hibernates the invoking processor. The "HalSuspendHibernateSystem" routine will be described in detail below with reference to FIG. 6.

After both the "HalHibernateProcessor" routine at step 160 and the "HalSuspendHibernateSystem" routine at step 170 are completed, then the computer system 10 is in a suspended power state or a hibernated power state, and the power down sequence ends at step 180.

FIG. 5 is a flow chart illustrating the "HalHibernateProcessor" routine, which is called by each processor, other than the invoking processor, when the computer system 10 is being placed in the suspended power state or the hibernated power state. Referring to FIGS. 3 and 5, the HAL 38 saves the processor's state in RAM 18 at step 200 and flushes the processor cache 15 at step 205.

At step 210, the processor is powered down (either actually or virtually), at which point the processor is no longer executing instructions. Whenever the computer system resumes, the HAL 38 will restart the hibernated processors, restore their state and return each processor.

FIG. 6 is a flow chart illustrating the "HalSuspendHibernateSystem", which is called by the invoking processor and puts the HAL 38 into the hibernated power state. Referring to FIGS. 1, 3 and 6, the HAL 38 waits for any other processors to hibernate via "HalHibernateProcessor" at step 215, and then saves any volatile HAL state, i.e., a snapshot of its operational contents, to RAM 18 at step 220.

It is preferable for the bootup firmware stored in ROM 19 to support a way to hook the bootup sequence into a resume sequence. Thus, at step 225, a resume requested vector for the ROM 19 is set in order to allow the bootup firmware to know where to send the processor that initiates the bootup for recovery. In the preferred embodiment, this is implemented by setting a well-known location in RAM 18 to a continuation address before suspending the machine. On powerup from a suspend or hibernate, the ROM 19 will detect the resume requested vector and send the processor(s) back to the HAL 38 for restoration.

At step 230 the HAL 38 saves the invoking processor's state in RAM 18. Step 235 is a query box to place the computer system 10 in either a suspended power state or a hibernated power state. It will be recalled that it was determined whether a suspended power state or a hibernated power state was called in step 110 in FIG. 4. If a suspended power state is called, then at step 240 the invoking processor will flush its processor cache 15, and at step 250 all components except for RAM 18 will be powered down. The routine then returns to complete the power down sequence shown in FIG. 4.

If, on the other hand, a hibernated power state is called, then at step 250, the invoking processor's cache 15 is flushed. At step 255, the current memory states are written to secondary storage area 21, and at step 260, all components, including RAM 18, are powered down, thereby hibernating the computer system. The routine then returns to complete the power down sequence shown in FIG. 4.

FIG. 7 is a flow chart illustrating a power up sequence, which resumes the computer system 10 from a suspended power state or a hibernated power state. Waking a computer system from a hibernated power state is the same as turning power to the machine on. Waking a computer system from a suspended power state begins like a typical power on sequence, except that early on in the boot sequence, the processor is sent back to the HAL 38 to restore the states of various components stored in RAM 18.

According to the preferred embodiment, the computer system 10 is "configured" during the power down sequence (either suspend or hibernate) as to what events should power up the processor and the rest of the computer system. The "on button" is always configured to be a wakeup event. Other typical wakeup events include an alarm setting (e.g., an application wants to wake up at a particular time to perform some task, so before suspending the machine, the operating system would set the battery-operated real-time-clock alarm), insertion or removal of a device on buses such as Cardbus, and a "ring indicate" detect.

Referring to FIGS. 1, 3 and 7, the operational flow begins at step 300 when a "power up condition" is detected. A power up condition may be any of a number of detectable conditions, for example, the pressing of a resume button by the user (that may be provided as an option on the keyboard), the opening of the lid on a portable computer, or the passing of a predetermined amount of time after a suspend or hibernate, or any other wakeup event that has been configured in the computer system.

After a power up condition is detected, the computer system 10 is awakened, or powered up, at step 305.

At step 310, the invoking processor's state is restored from RAM 18 and begins executing code. The state of each device is restored on an "as needed" basis. If the computer system is resuming from a hibernate, the memory states are first read from the secondary storage area 21 and inserted into RAM 18. At step 315, the HAL's state is restored. At step 320, all processors other than the invoking processor are restarted, and at step 325 the invoking processor is restarted.

The second aspect of the present invention relates to device-level power management. Device-level power management refers to the dynamic powering on of particular devices when in use and the powering down of devices when not in use in order to conserve energy. In general, a device is powered down when it is not in use in order to conserve energy. Thus, a system that remains idle for some duration will result in power to all devices being turned off, leaving the processor in a very low power state, with only enough power to the processor to enable it to field interrupts. A device is then powered up as it is needed.

The device-level power management system in the present invention requires that all currently loaded device drivers 23 have power management support. Possible power management support includes add-in peripherals with their own power savings features (e.g., an off/on setting), the presence of a suspend button, uninterruptable power supply support, and battery device support. The device driver 23 is responsible for ensuring that its corresponding device's state can be restored from memory when it is in the powered down state. Device drivers 23 which support physical devices 22 are also responsible for notifying the operating system 14 when they need their corresponding device 22 powered back on.

In the preferred embodiment, device-level power management decisions are made by different system components, in coordination with the power manager 42 (FIG. 3), depending on whether the device is being powered up or down. During power down, device-level power management decisions are moved to the highest level possible, i.e., where the powering down can be done most efficiently. For example, in the preferred embodiment, power off decisions for specific devices 22 occur at the following locations:

policy decisions concerning disk drives are performed in the cache manager.

policy decisions concerning video displays are performed in the user and graphical device interface (GDI).

policy decisions concerning com and parallel ports are performed in the corresponding drivers.

policy decisions concerning miniport drivers are performed at a higher layer. For example, policy decisions concerning the disk driver are performed in the cache manager, while the video driver is controlled by the user interface.

During power up, on the other hand, device-level power management decisions are made by the device driver 23 that is in control of the device 22. For example, if a disk drive controller wants to communicate with its disk drive, and the disk driver is not powered up, then the disk drive controller will issue a power up request to the power manager 42 to enable power to the disk drive.

FIG. 8A is a flow chart illustrating the implementation of device-level power management, in particular the dynamic powering down of a particular device 22 when it is not in use in order to conserve energy. Referring to FIGS. 3 and 8A, the power down sequence is initiated at step 400 when a power down IRP is requested by a device driver 23. The power down IRP is placed in the device driver's work queue, which is synchronized such that all current items in the work queue are processed before the power down IRP is processed. This allows the device driver 23 to know which requests preceded the power down request. Once a driver has received a power down IRP, no further requests will be sent until the power down IRP is completed. In addition, any requests other than power up or power down IRPs will not be sent until the device 22 is powered up and all pending power requests are completed.

At step 410 the device's state is saved. In the preferred embodiment, the possible device states are:

"Power Up": device in normal operation.

"Power Query": device stopped.

"Power Suspend": power down because system is suspending; device stopped; all requests flushed.

"Power Hibernate": power down because system is hibernating; device stopped; all requests flushed; all external device caching flushed.

"Power Down": power down to conserve power on that device; device stopped; all requests flushed; all external device caching flushed; device powered down.

At step 420, the device 22 is turned off, and at step 430, the device driver 23 returns an IRP completion, indicating that the power down IRP has been completed. This process of "completing" the IRP is the final step in the I/O manager's 40c processing of an IRP and is often referred to generally as I/O completion. Typical operations in an I/O completion include deleting internal data structures associated with the IRP, returning data to the caller, recording the final status of the operation in an I/O status block, and setting a file object and/or event to the signaled state.

FIG. 8B is a flow chart illustrating the implementation of device-level power management, in particular the dynamic powering up of a particular device 22 that needs to be accessed but is not powered on. Referring to FIGS. 3 and 8B, the power up is initiated at step 440 when a power up IRP is requested by a device driver 23. A power up IRP will be automatically requested by a device driver 23 whenever there is pending work to be processed by its corresponding device 22, and the device 22 is not powered on.

At step 450, the device 22 is turned on and initialized. Once the device 22 has powered back up, the device driver 23 may need to reinitialize the hardware depending on the state the device 22 was in. Re-initialization includes the reprogramming of the device 22 to the settings that it was configured for before power was disabled. Re-initialization, therefore, differs from initialization of a device 22 because new resource assignments and system mappings do not need to be performed.

After the device 22 is turned on and initialized (or re-initialized), the device's state is restored at step 460. The device 22 may start any pending IRPs that it may have queued while the power was disabled. At step 470, the device driver 23 returns an IRP completion, indicating that the power up IRP has been completed.

The above discussion on device level power management has described the operating system's ability to control the power consumption of various devices 22 that are connected to the computer system. In most cases, the devices 22 are originally installed in the computer system 10 and are recognized by the system's BIOS during bootup. Unlike conventional hardware-based schemes, however, the power management system of the present invention is not limited to devices that are originally installed on the computer system. Instead, the power management system of the preferred embodiment is also extensible to any "add-on" devices. The term "add-on" device refers generally to any device installed on the computer system 10 after the bootup process and not recognized by the BIOS during bootup.

Those skilled in the art will appreciate that there are many different ways to implement the hardware requirements for power management. In the simplest case, each device 22 would have its own power switch which would be used to adjust the power state of the device. An alternative implementation would be to incorporate the power switch on the bus instead of each device 22. In this embodiment, power management is based on the ability to control power to a given bus "slot", or by the device driver's 23 ability to control its device's 22 power consumption. This differs from previous power management schemes, in which the control is not specific to any one device 22.

FIG. 3 illustrates one possible hardware implementation, in which dynamically installed bus extenders 44 are provided to implement system level power management. Bus extenders 44 are device drivers that effectively abstract bus details and potentially the device-dependent details from the HAL 38 in order to implement power management for a given bus. In the preferred embodiment, a different bus extender 44 is provided for different buses.

Bus extenders 44 load before any other device driver 23 and register handles to the HAL 38 for a given bus. All HAL interfaces which are associated to a given bus are then passed to the corresponding bus extender 44. Thus, the bus extenders 44 are HAL abstractions that are actually implemented as a subset of a bus which is native to the HAL 38.

For example, if a particular device driver 23 is not capable of directly turning on or off a particular device 22, or placing the device in a particular power state, then the device driver can pass the request to the bus extender 44 for the given bus. The bus extender 44 will implement the request even though it may not know the particular details of the device 22. In the preferred embodiment, a device handler object is provided for each device 22, which allows the bus extender 44 to effectively locate the device and implement the request. Thus, by isolating certain bus details, the bus extender 44 coordinates with the device driver 23 to indirectly implement power management for a device 22 located on a given bus.

In view of the foregoing, it will be appreciated that the present invention provides a portable, software-controlled system for managing power consumption in computers. The power management system is integrated with the computer's operating system and device drivers, which allows for more informed and more efficient power savings decisions than in previous hardware-based power management schemes. Thus, the power management system enables the power status of the computer system and all the devices in the system to be controlled from the operating system software rather than the firmware, slushware or romware that is distributed with the computer's hardware. The power management system also provides greater extensibility and portability than previous systems, allowing new devices that are added to the computer to participate fully in power management.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing discussion.

What is claimed is:

1. For a computer system including a processor, a memory storage area, and a device associated with a device driver, the processor having a processor state, the memory storage area having a memory state, and the device driver having a device state, an operating system maintained in the memory storage area and executing on the computer system, the operating system operative to control the power consumption of the computer system by conducting the steps of:

detecting a power down condition indicating that the computer system should be suspended or hibernated;

verifying that the computer system is capable of being suspended or hibernated;

saving the device state of the device in the memory storage area;

powering down the device;

saving the processor state in the memory storage area; and stopping the processor.

2. The operating system of claim 1, wherein said power down condition is initiated by a user of the computer system.

3. The operating system of claim 1, wherein said power down condition is initiated by a program executing on the computer system.

4. The operating system of claim 1, wherein said verifying step comprises the steps of:

issuing an I/O request packet to the device driver for the device indicating that the computer system is about to be suspended or hibernated;

if the device is capable of being suspended or hibernated, then completing the I/O request packet;

otherwise, returning an error code.

5. The operating system of claim 1, in response to detecting the power down condition indicating that the computer system should be hibernated, further conducting the steps of:

writing the memory state of the memory storage area into a secondary storage area associated with the computer system; and disabling power to the computer system.

6. The operating system of claim 1, wherein the computer system further includes at least one control mechanism for affecting the power status of a selected device.

7. The operating system of claim 6, wherein said at least one control mechanism is operative to disable power to the selected device in response to the detection of the power down condition.

8. The operating system of claim 6, wherein said at least one control mechanism is included on the selected device.

9. The operating system of claim 1, wherein said operating system is portable from the computer system to a different computer system and is capable of being installed in the different computer system to control the power consumption of the different computer system.

10. A computer system, comprising:

a processor having a processor state;

a memory storage area coupled to said processor, said memory storage area having a memory state;

a device coupled to said processor, the device having a device state and having a corresponding device driver for controlling the operations of the device; and an operating system maintained in said memory storage area and providing computer-implemented instructions to the processor;

said processor, responsive to the computer-implemented instructions, is operative to control the power consumption of the computer system by detecting a power down condition indicating that the computer system should be suspended or hibernated, verifying that the computer system is capable of being suspended or hibernated, saving the device state of the device in the memory storage area, powering down the device, saving the processor state of the processor in the memory storage area, and stopping the processor.

11. The computer system of claim 10, further comprising more than one processor.

12. The computer system of claim 10, wherein said power down condition is initiated by a user of the computer system.

13. The computer system of claim 10, wherein said power down condition is initiated by a program executing on the computer system.

14. The computer system of claim 10, wherein said processor verifies that the computer system is capable of being suspended or hibernated by:

issuing an I/O request packet to the device driver for the device indicating that the computer system is about to be suspended or hibernated;

completing the I/O request packet if the device is capable of being suspended or hibernated; and otherwise, returning an error code.

15. The computer system of claim 10, wherein the processor is further operative to, responsive to detecting a power down condition indicating that the computer system should be hibernated:

write the memory state of the memory storage area into a secondary storage area associated with the computer system; and disable power to the computer system.

16. A computer-readable medium on which is stored a computer program for controlling the power consumption of a computer system having a processor, a memory storage area, and a device associated with a device driver, the processor having a processor state, the memory storage area having a memory state, and the device driver having a device state, the computer program comprising instructions, which when executed by the computer system, perform the steps of:

detecting a power down condition indicating that the computer system should be suspended or hibernated;

issuing an I/O request packet to the device driver for the device indicating that the computer system is about to be suspended or hibernated;

if the device is capable of being suspended or hibernated, then:

completing the I/O request packet;

saving the device state of the device in the memory storage area;

powering down the device;

saving the processor state in the memory storage area; and stopping the processor;

otherwise, returning an error code.

17. The computer-readable medium of claim 16, wherein said power down condition is initiated by a user of the computer system.

18. The computer-readable medium of claim 16, wherein said power down condition is initiated programmatically.

19. The computer-readable medium of claim 16, wherein said instructions, which when executed by the computer system, further perform the steps of:

in response to detecting the power down condition that the computer system should be hibernated, writing the memory state of the memory storage area into a secondary storage area associated with the computer system; and disabling power to the computer system.

* * * * *